United States Patent Office 3,311,471

Patented Mar. 28, 1967

3,311,471
PHOTOGRAPHIC REPRODUCTION PROCESSES AND MATERIALS THEREFOR

Martin Hepher, Harrow, Middlesex, England, assignor to Eastman Kodak Company, Rochester, N.Y., a corporation of New Jersey No Drawing. Filed Oct. 23, 1963, Ser. No. 318,163
12 Claims. (Cl. 96—1.5)

This invention relates to xerography and particularly to electrophotographic materials for use in xerographic processes.

Chemography is the name given to a new embodiment of xerography described in Canadian Patents No. 618,521 and No. 618,594, both of which issued April 18, 1961. In chemography, a photosensitive member is employed in which a persistent conductivity latent image is formed by exposure to a light pattern. The photosensitive layer in this member is characterized by a persistent change in conductivity when exposed to actinic radiation. It is this persistent change in conductivity that distinguishes this photosensitive member from conventional photoconductive xerographic plates which comprise a photoconductive layer of selenium, zinc oxide dispersed in resin, or the like. The Canadian patents mentioned above describe photosensitive members for use in chemography which comprise a conductive support on which is coated a photosensitive layer which comprises a dielectric matrix material such as an insulating resin, a sensitizer which undergoes a permanent or persistent chemical change on exposure to light, and when necessary, a solvent for dispersing the sensitizer in the dielectric matrix.

In a typical embodiment of the process of chemography a conductivity latent image is formed on the photosensitive chemographic plate by exposing the photosensitive layer to a pattern of actinic radiation, usually a light pattern. While this conductivity latent image persists, the plate is charged in a corona discharge to form an electrostatic latent image, corresponding to the conductivity latent image. The exposed and charged chemographic plate may be employed as a charged and exposed xerographic plate in any of various xerographic development and transfer processes. A visible image may be formed directly on the plate by toner development, or the plate may be employed in various other xerographic processes, such as charge transfer, toner image transfer, and the like.

According to the present invention a photosensitive element comprises a photosensitive layer which undergoes persistent change in electrical conductivity upon exposure to actinic radiation and which consists essentially of a resin binder having high electrical resistivity and dispersed therein a sensitizer, said sensitizer being a compound selected from compounds having the formula

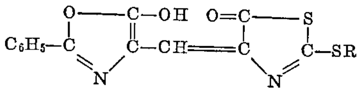

and isomers thereof, wherein R represents a member selected from the group consisting of alkyl, aryl and aralkyl.

Isomeric structures are:

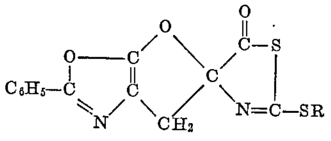

and

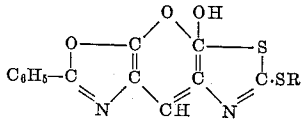

In photosensitive elements according to the present invention, the photosensitive layer may be strong enough to be self-supporting, in which case a support therefor is unnecessary, or it may be coated on a suitable support material. We have found that a satisfactory electrostatic latent image can be formed even when the backing support is not an especially conductive material. For example, quite suitable elements comprise a support of ordinary photographic backing paper which usually is not conductive when dry. When a conductivity latent image is formed prior to the corona charging step, a suitable electrostatic latent image can be formed on the photosensitive resin-sensitizer layer by corona charging even when the support is not a conducting material. Of course, conductive backing supports such as metal plates and foils, conductive papers and the like may also be used.

As the resin binder for the photosensitive layer, we prefer to employ a solid polystyrene resin, however other dielectric film-forming resins may also be used. It is necessary that the sensitizer be homogeneously dispersed in the resin binder and if the resin and sensitizer are incompatible a "solvent" of dispersing agent may be incorporated as described in Canadian Patent No. 618,594.

The invention may be more clearly understood by reference to the Canadian patents mentioned above and by reference to the following examples which describe in detail preparation and use of certain preferred photosensitive elements in accordance with the present invention.

EXAMPLE 1

Thirty grams of polystyrene pellets (Styron Grade 666, British Resin Products, Ltd.) were dissolved in 180 ml. toluene. To this was added 20 ml. of toluene in which was dissolved 0.4 gram of a sensitizing compound represented by the formula above wherein R is n-octyl. This compound had been prepared by the method described at J. Chem. Soc., 1952, page 2399 (E. B. Knott). The mixture was whirl-coated on baryta-coated photographic paper at a thickness of 4 thousandths of an inch and then dried by evaporating most of the solvent after coating. The prepared element was exposed for 8 seconds through a photonegative in a contact printer at a distance of 18 inches from a 125 watt mercury vapor lamp to form a conductivity latent image. The exposed element then was charged to form an electrostatic latent image corresponding to the conductivity latent image. This was done by passing the element under a negative corona discharge at a potential of about 6 kv. About 2 minutes after charging, the element was immersed in a bath of liquid xerographic toner consisting of 1 gm. Blue printing ink No. 4/4304 (Britannic Printing Supplies Ltd.) in 100 ml. medium hydrocarbon solvent (Esso Solvent 60).

After a few minutes the toner had formed a positive image on the element. The developed element was removed from the bath and dried.

EXAMPLE 2

The procedure of Example 1 was repeated but using instead the same amount of a sensitizing compound having the formula above wherein R is benzyl. Preparation of this compound is also described in the J. Chem Soc.

reference given above. A positive print of equivalent quality was obtained.

EXAMPLE 3

A compound having the above formula wherein R is ethyl was prepared by the procedure described in the J. Chem Soc. reference but by condensation of 4-ethoxymethylene-2-phenyloxazol-5-one with 2-ethylthiothiazol-5-one in alcoholic triethylamine. The product formed pale yellow needles, M.P. 162–163 (red) from acetone. This compound was used as the sensitizing compound in a photosensitive element prepared and tested by the procedure of Example 1. The resulting positive print was of equivalent quality.

The invention has been described in detail with particular reference to preferred embodiments thereof, but it will be understood that variations and modifications can be effected within the spirit and scope of the invention as described hereinabove and as defined in the appended claims.

I claim:

1. A photosensitive element comprising a photosensitive layer which is capable of forming a persistent conductivity latent image thereon when exposed to actinic radiation and which consists essentially of a dielectric resin binder having dispersed therein a sensitizing amount of a compound selected from the group consisting of compounds having the formula:

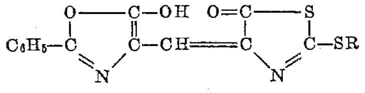

and isomers thereof, wherein R represents a member selected from the group consisting of alkyl, aryl and aralkyl.

2. A photosensitive element as defined in claim 1 wherein said sensitizing compound is an isomer having the formula:

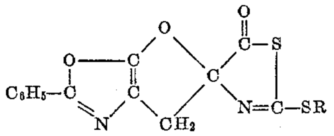

3. A photosensitive element as defined in claim 1 wherein said sensitizing compound is an isomer having the formula:

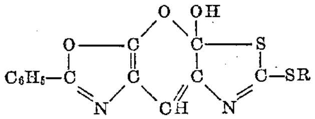

4. A photosensitive element as defined in claim 1 wherein said photosensitive layer is coated on a backing support.

5. A photosensitive element as defined in claim 4 wherein said backing support is paper.

6. A photosensitive element as defined in claim 1 wherein said dielectric resin consists essentially of a polystyrene resin.

7. A photosensitive element as defined in claim 1 wherein R is n-octyl.

8. A photosensitive element as defined in claim 1 wherein R is benzyl.

9. A photosensitive element as defined in claim 1 wherein R is alkyl.

10. A photosensitive element as defined in claim 1 wherein said dielectric resin is a polystyrene resin and wherein R is n-octyl.

11. A photosensitive element as defined in claim 1 wherein said dielectric resin is a polystyrene resin and wherein R is benzyl.

12. A photosensitive element as defined in claim 1 wherein said dielectric resin is a polystyrene resin and wherein R is ethyl.

No references cited.

NORMAN G. TORCHIN, *Primary Examiner.*

R. MARTIN, *Assistant Examiner.*